Aug. 27, 1963  W. N. POUNDSTONE  3,101,934
RESILIENTLY MOUNTED CUTTING TOOL
Filed Aug. 31, 1959
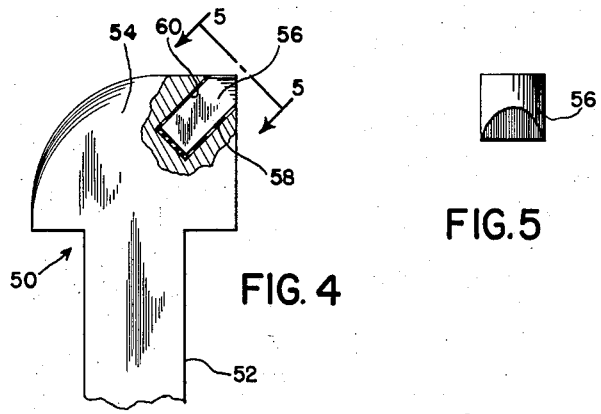
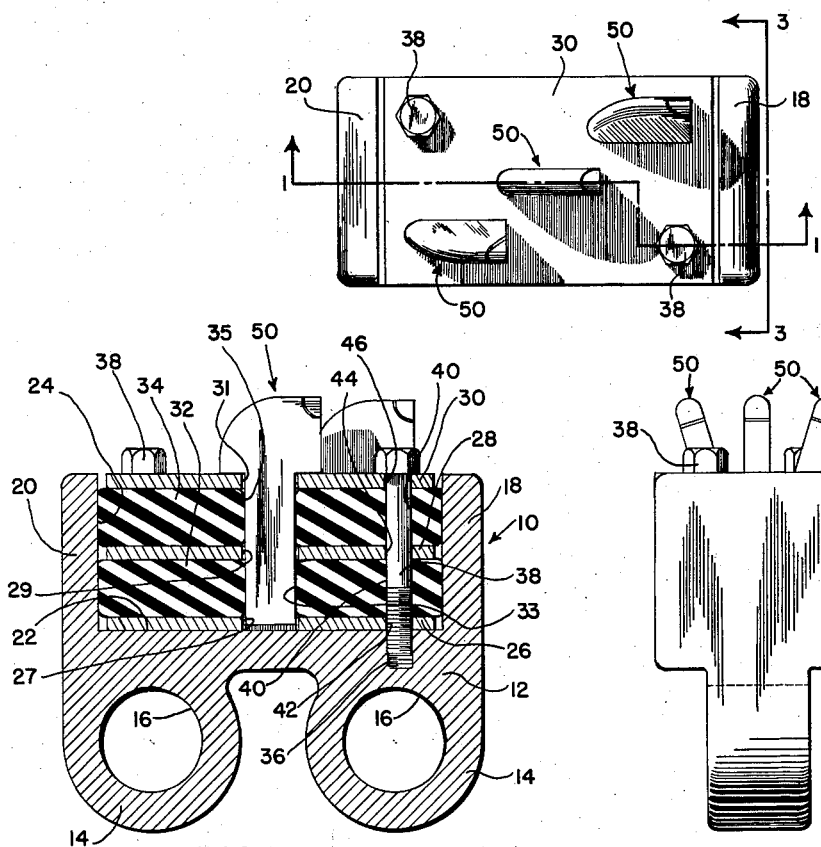
INVENTOR.
WILLIAM N. POUNDSTONE
BY Stanley J Price
his ATTORNEY

United States Patent Office 3,101,934
Patented Aug. 27, 1963

3,101,934
RESILIENTLY MOUNTED CUTTING TOOL
William N. Poundstone, Morgantown, W. Va., assignor to Consolidation Coal Company, Pittsburgh, Pa., a corporation of Pennsylvania
Filed Aug. 31, 1959, Ser. No. 837,088
3 Claims. (Cl. 262—33)

The present invention relates to a resiliently mounted cutting tool. More particularly, it relates to a combination of a novel tool holder which resiliently mounts a cutting tool. The invention is concerned with the type of cutting tool known as a cutter bit which is used in mechanized coal mining operations.

Mechanization in coal mining operations resolves itself basically to the cutting away or disintegrating of the coal seam by a plurality of cutter bits. The cutter bits may be a part of a continuous boring type mining machine that removes the coal by boring an elliptical entry into the vein of coal. The cutter bits may be a part of a drum head type continuous mining machine having a plurality of horizontal endless cutter chains arranged adjacent to each other and driven as a unit. This type of mining machine chips away the coal as it advances into the vein. The bits may also be a part of a single endless cutter chain that is employed to undercut the coal in the vein in preparation for the blasting operation.

The conventional method for securing cutter bits in bit holders is by means of a set screw wedging the bit shank against the guide wall of the shank receiving portion of the holder. This causes the shank portion of the cutter bit to be in metal-to-metal contact with the side wall of the bit holder so that the set screw may clamp the two together. Certain disadvantages that accrue from this conventional securing means are overcome by the present invention as will be described in the following.

Since the cutting tools or cutter bits are designed to cut the relatively hard coal and rock within a coal mine, they must be formed of hard material. They are usually formed of highly hardened steel. As a result of the hardening process, this steel is also made quite brittle. When mounted on mining machinery these relatively hard and brittle cutter bits undergo shock from the contact of the cutter bits with the coal seam. This shock is often of sufficient magnitude to cause the brittle cutter bits to chip and break. The conventional mounting means for these cutting tools which forces the shank of the tool into metal-to-metal contact with the holder by a set screw only further contributes to the breakage of the tools from the shock of contact with the coal seam.

In its broadest aspects, this invention contemplates the resilient mounting of the hard, relatively brittle portions of the cutting tool to lessen the chance of breakage of these hard portions from shock. The invention provides a novel tool holder which may be utilized to resiliently mount a cutting tool upon a mining machine.

In addition to resiliently mounting the cutting tool, the tool holder of the present invention provides certain other advantages over conventional cutting tool holders. It is a prime requirement of tool holders that the cutting tool easily be changed, that is, that the cutting tool may be easily replaced when it is worn or broken. The present invention provides a tool holder which allows for tool change with a minimum of effort and time. The tool holder of the present invention may also be utilized as a multiple tool holder; that is, several cutting bits may be secured by this single tool holder. This multiple holder allows several cutting bits to be placed in the space normally required to retain a single bit. Further, the several bits which are secured by a single holder may all be changed as quickly as a single bit may be changed. In the previously described conventional tool holders, the set screws which retain the cutter bits often become very difficult to turn. This usually occurs because the threads of the set screw and the tops of the screws become contaminated by coal dust making them difficult to loosen. The present invention provides a tool holder in which the working parts are protected from contamination by coal dust and therefore may be utilized successfully in the most rugged conditions.

With the foregoing considerations in mind it is a primary object of the present invention to provide a combination of a cutting tool resiliently mounted in a novel tool holder.

It is another object of the present invention to provide a novel tool holder for resiliently and securely mounting a tool for quick change.

It is another object of the present invention to provide a tool holder in which the tools are not loosened by vibration of the operating machinery.

It is another object of the present invention to provide a tool holder which secures several tools simultaneously.

Further objects and advantages of this invention will become evident as a description proceeds and from an examination of the accompanying drawings which illustrate an embodiment of the invention.

In the drawings:

FIGURE 1 is a side elevation, in section, of the present invention; the section being taken on line 1—1 of FIGURE 2.

FIGURE 2 is a top plan view of the tool holder and cutting tools of the present invention.

FIGURE 3 is an end elevation of the tool holder and cutting tools of the present invention as viewed from line 3—3 of FIGURE 2.

FIGURE 4 is a fragmentary view of the cutting tool in elevation illustrating in section the mounting of the cutting tip.

FIGURE 5 is a detailed view showing the shape of the cutting tip of the present invention as viewed from line 5—5 of FIGURE 4.

Referring now to the drawings in which like reference numerals refer to similar parts on all figures, the invention will be described in some detail. As shown in FIGURES 1, 2, and 3, the tool holder 10 of the present invention takes the form of a link in an endless cutter chain. This link has cheeks 14 which provide bores 16 that receive the pintles which secure the chain together. The body portion 12 of the tool holder is integral with the cheeks 14. This construction of the tool holder 10 as a link in an endless cutter chain is by way of example only. The body portion 12 of the tool holder might just as well be secured to a continuous boring machine, the drum head of a continuous miner, or other suitable type of mining machine. The present invention is directed to the provision of the body portion 12 of the tool holder 10 and the manner in which the cutting tools 50 are secured by the tool holder.

As best seen in FIGURE 1, the body portion 12 of the tool holder has upstanding end walls 18 and 20. These end walls 18 and 20 create an outwardly facing recess of which the body portion 12 forms the bottom wall 22. Disposed within the recess 24 are three bearing plates 26, 28 and 30 and two pieces of clamping material 32 and 34.

The bearing plates 26, 28 and 30 are formed of rigid material such as sheet metal or the like. Bearing plate 26 has three tool receiving holes 27 and two bolt holes 42 formed therein. Bearing plate 28 has three tool receiving holes 29 and two bolt holes 44 formed therein. Bearing plate 30 has three tool receiving holes 31 and two bolt holes 46 formed therein. The bearing plates 26, 28 and 30 are of such length that they freely fit between the end walls 18 and 20 forming recess 24.

Also disposed within recess 24 are two pieces of clamping material 32 and 34. These pieces of material 32 and 34 are made of a relatively deformable, resilient substance such as rubber or the like. The pieces 32 and 34 are of such size that they fit within recess 24 with close clearance. Formed in the clamping piece 32 are three tool receiving passages 33 and two bolt receiving passages 40. Formed in clamping piece 34 are three tool receiving passages 35 and two bolt receiving passages 40. The bolt holes 42, 44 and 46 of bearing plates 26, 28 and 30 and the bolt passages 40 of clamping material 32 and 34 are vertically aligned so as to provide for vertical bolt passages. The cross sectional area of these bolt holes and passages is such that bolts 38 pass freely through these passages.

The tool receiving holes 27, 29 and 31 of the bearing plates 26, 28 and 30 are also aligned with the tool receiving passages 33 and 35 of the pieces of clamping material 32 and 34. Thus, the bearing plates and pieces of clamping material are arranged to form tool passages. One of the tool passages is vertical. The other two tool passages are disposed at an angle to the vertical to receive two obliquely mounted cutting tools 50 as is best shown in FIGURE 3. It will be appreciated that the three cutting tools 50 disposed in a single holder conserve space in the length of the chain and also provide for a wider kerf to be cut by the cutting machine.

The size of tool receiving holes 27, 29 and 31 in bearing plates 26, 28 and 30 is such that the shank of tool 50 passes freely through these holes. The size of the tool receiving passages 33 and 35 in the pieces of clamping material 32 and 34 is such that the shank of the tool 50 has little clearance in the passages 33 and 35. The bolts 38 which pass freely through bolt passages 40 and bolt holes 42, 44 and 46 are threaded into tapped holes 36 formed in the body portion 12 of the tool holder 10.

Bearing in mind the component parts of the tool holder as herein described, the manner in which the holder functions will become readily apparent. The bearing plates 26, 28 and 30 and the pieces of clamping material 32 and 34 are disposed within the recess as shown in FIGURE 1. The bolts 38 are then passed through the bearing plates and clamping material and threaded into tapped holes 36 in the body portion 12 of the tool holder 10. The bolts 38 are threaded into the holes until their heads are in loose contact with the bearing plate 30. The cutting tools 50 are then placed with their shank portions in the tool receiving passages. The bolts 38 are then tightened to force bearing plate 30 toward the bottom wall 22 of recess 24. As the bearing plate 30 is so forced, the clamping material 32 and 34 is deformed so that it more forcefully contacts end walls 18 and 20 and constricts passages 33 and 35 that surround the shank of the tool. Thus, the tool is retained within the tool passage by the clamping action of the pieces of clamping material 32 and 34. Because tool receiving holes 27, 29 and 31 in bearing plates 26, 28 and 30 are of greater size than the cross-sectional area of the tool shank, the bearing plates are not in metal-to-metal contact with the shank of the tool. The only support for the tool is the resilient clamping material 32 and 34.

As shown in FIGURE 1, the tool holder has two pieces of clamping material 32 and 34 and three bearing plates 26, 28 and 30 disposed within the recess 24. The invention may also function with but a single larger piece of clamping material and but a single clamping plate 30. The multiple pieces of clamping material shown in the drawings may be formed from more readily available sizes of resilient deformable material, and therefore the economic considerations of utilizing the more readily available material dictate the use of multiple bearing plates and pieces of clamping material. While the invention of the tool holder has been described as a multiple bit holder, a single bit holder might be constructed in a manner similar to that described.

Turning now to FIGURES 4 and 5, the especially constructed cutting tool 50 is shown in some detail. As shown in FIGURE 4, the cutting tool 50 has a shank portion 52 and a cutting head 54. A cutting tip 56 of particularly hard material such as carbide is disposed within cutting head 54. In order to reduce the shock forces which might cause breakage of the relatively brittle cutting tip 56, the tip 56 is disposed within a liner 58. Liner 58 is formed of a deformable, resilient material such as rubber. The dimensions of liner 58 are such that its outer dimensions are slightly greater than the internal dimensions of socket 60. The internal dimensions of liner 58 are slightly less than the external dimensions of cutting tip 56. Thus, an interference fit between the liner and cutting head 54 and between the cutting tip 56 and the liner 58 is provided. In most instances, the interference fits between the cutting tip 56, liner 58 and cutting head 54 are sufficient to retain the cutting tip 56 within the cutting head 54. A bonding material may also be utilized to bond the cutting tip 56 to the interior of the liner, and to bond the exterior of the liner to the socket 60. In some instances it may be desirable for the bonding material to serve as both the liner and the means for securing the tip 56 within the socket 60. Thus, a resilient means is provided to mount the cutting tip within the cutting head and thereby reduce chances of the cutting tip chipping or breaking due to shock loads imposed when the cutting tip contacts the seam of coal being cut.

When used in combination with the tool holder described earlier in this disclosure, the special cutting tool 50 provides for a most efficient cutting system. The resilient mounting of the cutting tip 56 within the cutting head 54 allows a high degree of hardness to be provided to cutting tip 56. The cutting tool 50 on the other hand, being provided with a resilient mounting holder 10, may also be formed of relatively hard material since it is less likely to be broken by the shock of the cutter striking the coal.

When the cutting tool becomes worn, it may easily be removed and replaced. It is only necessary for the operator to loosen bolts 38 until their heads loosely abut the bearing plate 30. The cutting tools 50 may then be pulled from the cutting tool passages. New cutting tools may be inserted, and the bolts 38 again tightened. Since the bolts 38 are never removed from their tapped holes, and since the bearing plates 26, 28 and 30 are never removed from recess 24 and since the pieces of clamping material 32 and 34 are never removed from recess 24, the tapped holes 36 are always completely protected and can not become contaminated with coal dust or otherwise become inoperative. The clamping action of bolts 38 and bearing plates 30 and 28 which causes the pieces of clamping material 32 and 34 to deform against the upstanding walls 18 and 20 of the body portion 12 serves to provide a seal about the edges of the clamping material 32 and 34 so that dirt may not pass into the recess 24.

Once bolts 38 are tightened to retain the cutting tools 50 within the tool holder 10, the resilience of the clamping material 32 and 34 serves to lock the bolts so that vibration may not loosen them. Thus, the resilient clamping material provides a self-locking action which retains the cutter heads firmly in place no matter how much vibration they are subjected to.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. In combination a tool holder and a cutting tool, (a) said tool holder having a body portion,
(b) a recessed opening in said body portion with a bottom wall,
(c) deformable clamping material disposed within said recessed opening,
(d) said cutting tool having a shank portion and a cutting portion,
(e) a tool shank receiving passage formed in said deformable clamping material,
(f) said cutting tool shank portion positioned in said passage in spaced relation to said body portion bottom wall,
(g) means to retain said deformable clamping material within said recess and to bias said material against said bottom wall whereby said material deforms to abut said cutting tool shank portion and secure said cutting tool within said passage and in spaced relation to said bottom wall in a manner that said tool is insulated from said holder body portion when said tool is secured within said holder.

2. In combination a tool holder and a cutting tool,
(a) said tool holder having a body portion,
(b) a recessed opening in said body portion with a bottom wall,
(c) deformable clamping material disposed within said recessed opening,
(d) a rigid bearing plate disposed freely within said recessed opening,
(e) a tool receiving aperture formed in said plate,
(f) a plurality of other apertures formed in said tool holder body portion,
(g) a like plurality of bolt passages formed in said material in alignment with said other apertures in said tool holder body portion,
(h) a like plurality of bolt apertures in said plate in alignment with said bolt passages,
(i) a like plurality of clamping bolts passing freely through said bolt apertures and said bolt passages and threaded into said other apertures in said tool holder body portion,
(j) said cutting tool having a shank portion and a cutting portion,
(k) a tool shank receiving passage formed in said deformable clamping material,
(l) said cutting tool shank portion positioned in said passage and in said tool receiving aperture in spaced relation to said body portion bottom wall,
(m) said rigid bearing plate and said clamping bolts coacting to retain said deformable clamping material within said body recessed opening and to bias said material against said bottom wall whereby said material deforms to abut said shank portion and secure said cutting tool within said passage and in spaced relation to said body portion bottom wall in a manner that said tool is insulated from said holder body portion when said tool is secured within said holder.

3. In combination a tool holder and a cutting tool as set forth in claim 2 in which said cutting tool has an enlarged head portion, said bearing plate positioned in overlying relation with said deformable clamping material within said body portion recessed opening, said cutting tool positioned with said head portion abutting said rigid bearing plate.

References Cited in the file of this patent
UNITED STATES PATENTS

| | | |
|---|---|---|
| 2,101,376 | Voigtlander | Dec. 7, 1937 |
| 2,468,946 | Sherman | May 3, 1949 |
| 2,711,892 | Fulke | June 28, 1955 |
| 2,879,069 | Swanson | Mar. 24, 1959 |
| 2,907,559 | Brown et al. | Oct. 6, 1959 |
| 2,922,656 | Belloli | Jan. 26, 1960 |